United States Patent [19]

Lawrence et al.

[11] Patent Number: 4,868,782
[45] Date of Patent: Sep. 19, 1989

[54] DISPLAY TERMINAL

[75] Inventors: Stephen G. C. Lawrence, Swanmore; Michael A. McMorran, Totton; Brian H. Middleton, Littleton, all of United Kingdom

[73] Assignee: International Business Machines Corporation, Armonk, N.Y.

[21] Appl. No.: 61,235

[22] Filed: Jun. 10, 1987

[30] Foreign Application Priority Data

Jun. 11, 1986 [GB] United Kingdom ............... 8614210

[51] Int. Cl.⁴ ............................................. G06F 3/153
[52] U.S. Cl. .................... 364/900; 364/933.9; 364/927.4; 364/975.1
[58] Field of Search ... 364/200 MS File, 900 MS File

[56] References Cited

U.S. PATENT DOCUMENTS

| 3,626,382 | 12/1971 | Pedersen et al. | 340/172.5 |
| 4,064,490 | 12/1977 | Nagel | 364/200 |
| 4,641,262 | 2/1987 | Bryan et al. | 364/900 |
| 4,724,521 | 2/1988 | Carron et al. | 364/200 X |

FOREIGN PATENT DOCUMENTS

| 0010140 | 12/1977 | European Pat. Off. . |
| 2144892 | 10/1970 | United Kingdom . |
| 2011671 | 2/1971 | United Kingdom . |
| 2079995 | 1/1975 | United Kingdom . |
| 2056133 | 6/1980 | United Kingdom . |

Primary Examiner—Thomas M. Heckler
Attorney, Agent, or Firm—Mark S. Walker; Frederick D. Poag

[57] ABSTRACT

A display terminal of the type which is dependent on a remote processor for its operation and for its main data storage, comprising an interactive language interpreter (24) (e.g. for BASIC), terminal processor, local storage, display and a switch for switching between a session (90) associated with the remote processor and a session (91) dedicated to servicing the interactive language interpreter (24). During an interactive language session screens of data associated with the host session may be displayed and then saved which enables host data to be processed using user programs in the interactive language.

20 Claims, 4 Drawing Sheets

# DISPLAY TERMINAL

FIELD OF THE INVENTION

This invention relates to a display terminal for communicating with a remote data processor and in particular to a display terminal comprising a processor, memory, user input means, a display and means for communicating with the remote processor.

BACKGROUND OF THE INVENTION

In this application the term "display terminal" refers to a terminal which is dependent on a remote processor for its operation and for its primary data storage, as opposed to a stand-alone work station which can be used in conjunction, as necessary, with a remote processor.

Display terminals which rely for their operation on a remote processor and are used for data entry and/or display of data in communication with the remote processor are well known in the art. They are characterised by limited "in-head" processing and storage capacity which is used for controlling the communication functions between the remote processor and the terminal. Typically, the display terminal does not have local disc drives or other such storage facilities and display terminal resources including, for example, the data sets, or files, are managed by the remote (host) processor. An example of such a display terminal is the IBM 8775 terminal in the IBM 3270 family.

It is known that one can use a personal computer (PC) or other workstation which can operate as a stand-alone unit for the input of data to, and the display of data from, a remote processor. The advantage of a workstation or PC over a display terminal is that they are more flexible in enabling preprocessing of the data to be input to, or post processing of the data received from the remote processor by providing a wide range of independent functions. The disadvantage of a workstation or PC compared to a display terminal is primarily a question of cost.

SUMMARY OF THE INVENTION

The object of the present invention is to augment existing display terminal functions to provide greater flexibility without the expense of a workstation or a PC.

This object is met in accordance with the claimed invention by incorporating an interactive language interpreter into a display terminal and by providing means for switching between a session dedicated to servicing the interactive language interpreter and a session associated with the remote processor.

As mentioned above, it is known for a personal computer, which will normally include an interactive language interpreter, to also be provided with a terminal emulator facility (e.g. as in the IBM 3270 PC with an IBM 3278 emulator card). However a PC conventionally includes substantial local storage facilities such as floppy and/or hard disc drives for storage of the necessary code.

As a display terminal of the type specified above would not have adequate local storage facilities for permanent storage of all the necessary code, it is foreseen that the interpreter code would normally be downloaded from the remote processor when required.

DESCRIPTION OF A PREFERRED EMBODIMENT

Figure 1:
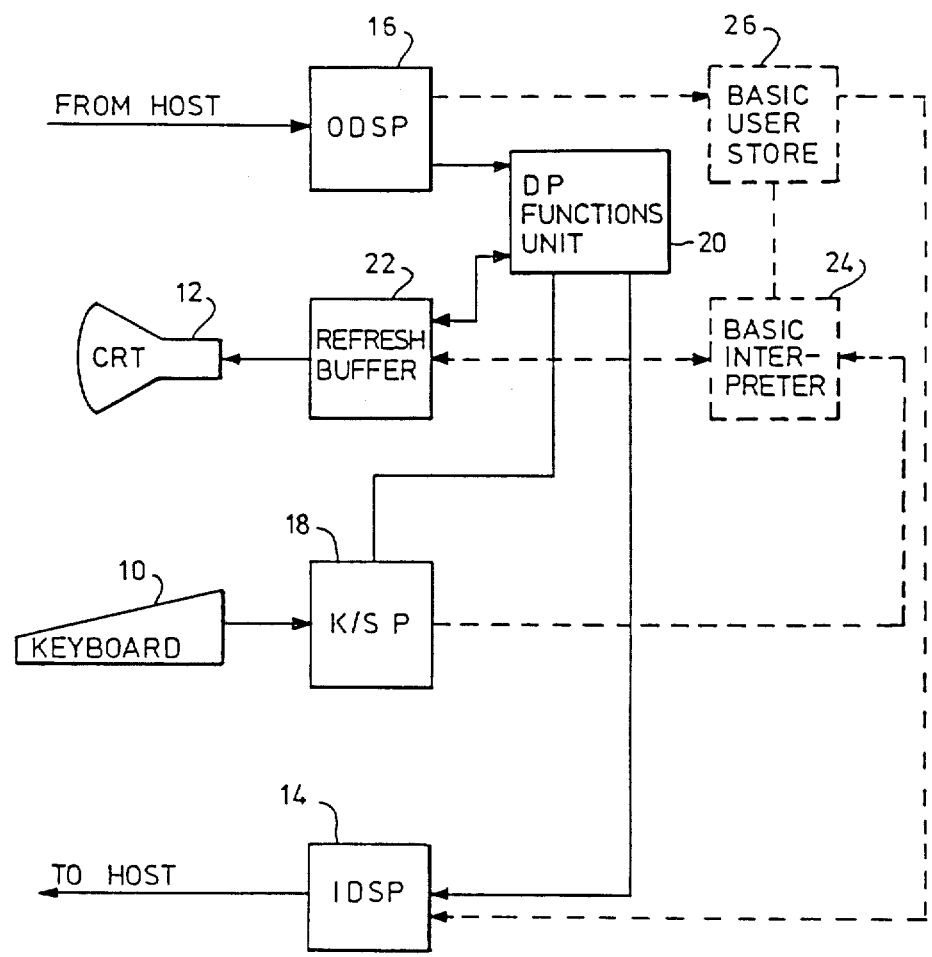
FIG. 1 is a block diagram showing the principle functional units of a display terminal according to the present invention and the main data paths between those units.

The preferred embodiment of the invention, as shown in FIG. 1, is based on a conventional IBM 8775 display terminal, which comprises a keyboard 10 for user input and a display device in the form of a cathode ray tube (CRT) display 12 for displaying information to the user. For communication with the host processor (not shown) to which the terminal is connected an inbound data stream processor (IDSP) 14 and an outbound data stream processor (ODSP) 16 are provided. Keystrokes from the keyboard are processed by a keystroke processor (K/S P) 18 and passed for processing to the data processing (DP) functions unit 20, which also receives input from the outbound data stream processor 16. The DP function unit 20 outputs information to be displayed to a refresh buffer 22 and information to be transmitted to the host to the inbound data stream processor 14.

In order to implement the present invention the structure described above is supplemented by an interactive language interpreter 24, in the preferred embodiment for the language BASIC. Storage (26) is allocated in the terminal for user programs and a means is provided for switching between a conventional DP session and a BASIC session.

Figure 2:
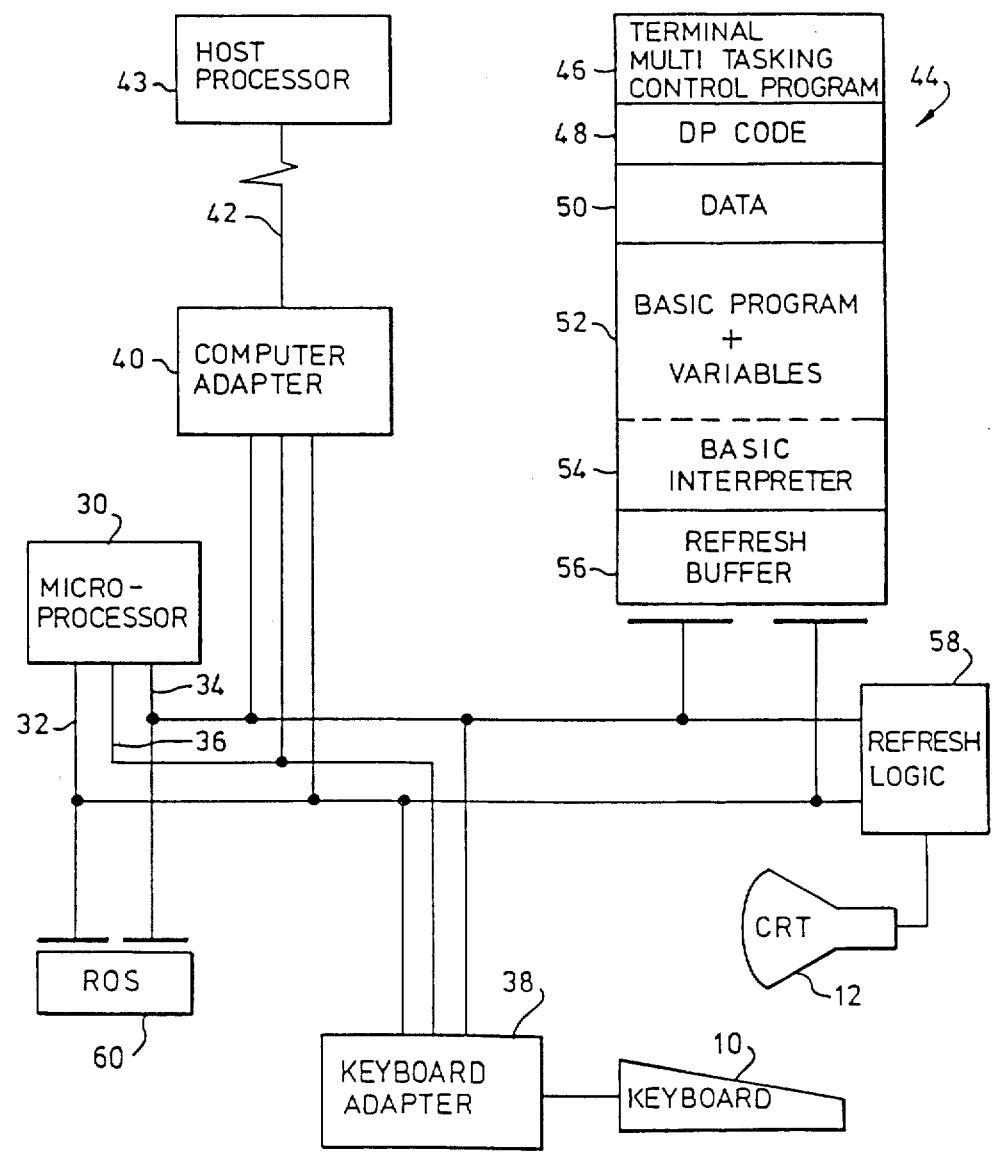
FIG. 2 is a block diagram showing how the display terminal of FIG. 1 may be implemented by a single microprocessor with associated components.
Figure 3:
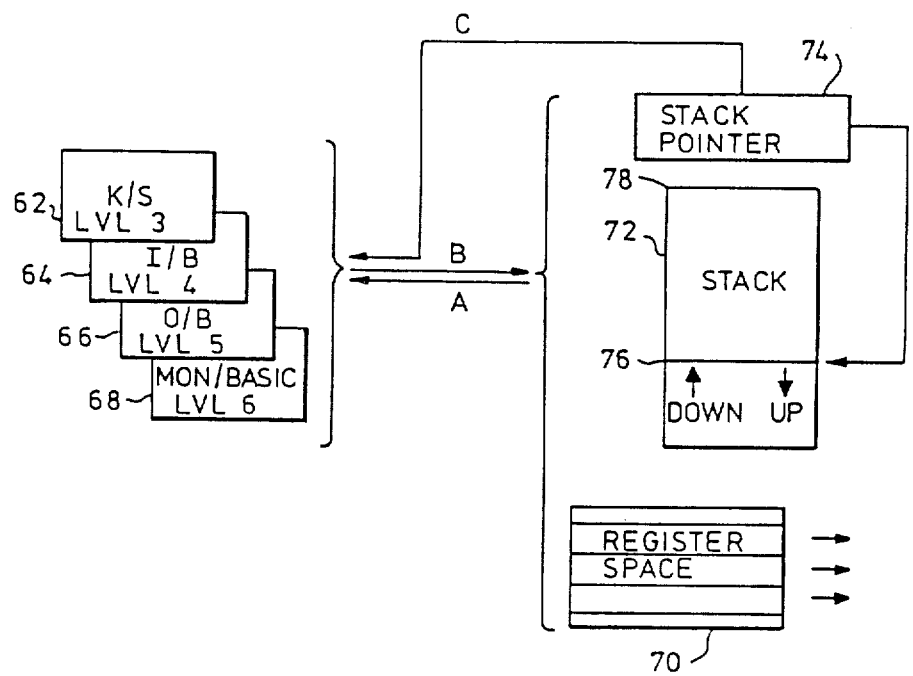
FIG. 3 is a schematic diagram showing the interrelationship between various storage elements and task priorities in the display terminal of FIG. 1.

FIG. 2 shows how the functional structure shown in FIG. 1 can be built using a single microprocessor 30, in this case a Motorola M6800 microprocessor with various components, known per se, connected thereto via a data bus 32, an address bus 34 and an interrupt line(s) 36. The keyboard 10 is connected to the system bus through a keyboard adapter 38, which interfaces the scan codes from the keyboard 10 with the microprocessor 30. A communications adapter 40 interfaces the microprocessor 30 with a communication link 42 to the host processor 43. Connected to the data and address buses 32 and 34 is a random access memory 44 divided logically into a number of sections. Section 46 contains a multi-tasking control program for the terminal. The control program performs scheduling and suspension of tasks using a stack 72 (FIG. 3). Section 48 contains the DP code used for the conventional terminal operations of an IBM 8775 terminal including the keystroke processing code for managing the keyboard adapter (cf. 18 in FIG. 1) and the communications control code (cf. 14 and 16 in FIG. 1). Section 50 is for obtaining data used in those conventional operations including data received from the host. Section 54 contains code for the BASIC interpreter 24 of FIG. 1 and section 52 is reserved for user BASIC programs and data (cf. BASIC user store 26, FIG. 1). The refresh buffer 22 is constituted by section 56. Information to be displayed is loaded into section 56 from section 50 or 52 by the microprocessor. Refresh logic 58 periodically reads the contents of section 56 and drives the CRT 12 in accordance with those contents. A read only store (ROS) 60 contains invariant sections of code.

As indicated above, the various components of FIG. 2 are know per se and may be constituted by an IBM 8775 display terminal. Consequently, no detailed description of the components will be given. However, in the following description, more details will be given of the tasks to be performed, and of the various priorities assigned to those tasks.

The task structure of the display terminal of FIG. 2 has six levels of priority as follows; highest priority first:
1. Host link communication;
2. Keyboard adapter providing keyboard data service;
3. Keystroke processing;
4. Inbound (to the host) data stream processing;
5. Outboard (from the host) data stream processing;
6. Monitor/scheduler/BASIC task This task structure differs primarily from the conventional IBM 8775 data terminal structure in that the BASIC interpreter task has been incorporated into the monitor task on level 6. By incorporating the basic task into the monitor at this level the BASIC interpreter is able to make use of the aforementioned stack for the temporary storage of data used during the interpreting process as will be explained later. The monitor and interpreter routines form part of the control program of the display terminal.

It should be noted the initially the BASIC interpreter will not be resident in the terminal and has to be down-loaded from the remote processor. Preferably it is only down-loaded from the remote host processor when the user specifically requests BASIC to be initialised (termed secondary initialisation in this specification) as will be explained later.

Each task in the system, with the exception of the two highest priority tasks, and possibly the monitor task, has associated with it a task control block 62, 64, 66, 68 (see FIG. 3). The task control blocks are stored with the control program in section 46 (see FIG. 2) of the random access memory. In the preferred embodiment the monitor task is also provided with a task control block 68. The task control blocks are chained together, and it is the position in this chain which indicates the priority of the task. The first two tasks are associated with their respective interrupt handlers (not shown) and can pre-empt the task with a lower priority.

Each task control block contains the following information:
Register save area (16 bytes)
Task status flags
Task start address
Save area for the stack pointer
Number of stack entries when suspended
Save area for stacked data (16 bytes)
Pointer to the next task control block The register save area is used for the temporary storage of information for the task associated with the task control block from an area of storage 70 (FIG. 3) which is shared with the other tasks. This shared area of storage comprises 16 bytes of storage which can be accessed by the microprocessor using direct addressing (a MC 6800 feature) and may therefore be looked on as "register space". When a task is suspended, A (FIG. 3), the contents of its "registers" are dumped from this register space to the register save area of its task control block. Conversely, when a task is scheduled, B (FIG. 3), the contents of its "registers" are loaded into the register space from its task control block.

The task status flags contain information describing whether the task is currently busy, needs to be scheduled, or is suspended. If the task is suspended, the reason for suspension is also kept here. The task start address is the memory address of the first instruction of the task. The value of the stack pointer 74 is saved in the task control block at the time the task is either initiated or restarted, C (FIG. 3), so that in the event of the task entering the suspended state, A, all data previously put on to the stack 72 by the task may be pulled off and save in the save area of the task control block; the number of stack entries also being saved. Thus, if a high priority task is 'suspended, a lower priority task may be stated, B, by simply restoring its stack contents from the task control block. In addition this technique reduces the amount of storage space that need be allocated to the stack.

Conventional IBM 8775 tasks can only push a maximum of 16 bytes of information onto the stack. The BASIC interpreter will, however, push many more bytes than this onto the stack when interpreting, for example, "GOSUB" and "FOR" statements in the user's BASIC program. Although the monitor task with the BASIC interpreter is at the logical top 76 of the stack at secondary initialisation time, it is, however, unnecessary to save its stack contents when a higher priority task or interrupt is executed as it is the lowest priority task. This is because all higher priority tasks/interrupts will simply 'push' the monitor stack contents with the information put onto it by the BASIC interpreter further down as they come into execution and then 'pop' the contents back up as they surrender control. Eventually the original monitor/BASIC contents reach the logical top together with the machine status and execution can be resumed on the next ReTurn from Interrupt (RTI) instruction. Thus, by making the BASIC interpreter dependent on the monitor task the lowest priority task, there is no danger of corrupting the data associated with this task when interrupted.

The pointer to the next task control block provides the means for the control program to work sequentially through the task control blocks in their pre-determined order of priority, looking for the highest priority task which needs to be scheduled or re-started.

Tasks are always initiated or re-started by the scheduler routines in the monitor task. These routines may be executed immediately following an interrupt driven event, such as a key being depressed on a keyboard, or alternatively it may be invoked using a software interrupt mechanism from a monitor task which is always running in the background. Although the monitor task has an associated task control block, after initialisation it is always running and is never suspended. The BASIC component itself can enter a 'Wait' state, however, whilst waiting on a host event such as the host sending a record. The scheduler checks for resources becoming available and messages arriving over the communications interface.

When the scheduler in invoked, any high priority hardware interrupts—such as those arising from the communications adapter—are enabled. The scheduler then begins to scan through the task control blocks, starting with the highest and ending with the lowest priority, looking for a task to be initiated or resumed. Briefly, the scheduler does the following.

If a candidate task is busy and not suspended then, after restoring the register space from the task control block (if necessary), the task is resumed by means of a ReTurn from Interrupt (RTI) instruction (since the reason the task was not running could only be that it had been interrupted by a higher priority task).

If a task is busy and suspended then, if the reason for suspension is still present, the next task control block in the chain is examined. If, however, the reason for suspension is no longer present (e.g. a resource has now become available), the data currently in the register space is saved in the register save area of the task control block associated with that data, the register space and the stack are restored from the task control block under examination, and the task is restarted by means of a 'ReTurn from Subroutine' (RST) instruction. (See below for a description of the task suspension mechanism).

If a task is not busy then, if the 'schedule' flag has been set in the task control block currently being examined, the 'busy' flag is also set and the task is initiated by branching to the start address contained in that task control block. Prior to branching to the start address, the current contents of the register space is saved in the register save area of the task control block associated with the current task. In the case of the BASIC portion of the monitor task, the start address is the BASIC interpreter initialisation entry point contained in a "BASIC communication area" and is only entered when a flag, set by a higher priority task, indicates that BASIC is to be activated or a "JUMP SESSION" key (92, FIG. —described later) has been depressed. The "BASIC communication area" is an area of section 52 (see FIG. 2) of storage, which area forms a general repository for routine addresses and values required in the communications between BASIC and its supporting software on level 6.

If the task is neither busy nor to be scheduled, then the next priority task control block is examined, and so on until the lowest priority task control block (which has a chain pointer of zero) is reached.

If the point is reached where no higher priority task may be started, then the monitor/BASIC task is resumed via a 'ReTurn from Interrupt' (RTI) instruction.

Once a task has finished execution either permanently or temporarily, the scheduler is always invoked starting with the highest priority task rather than the task next in priority to that which has just finished. This is so that if two tasks are waiting for the same resource, then the higher priority task will get it first.

As mentioned above, the monitor and scheduler routines form part of the control program of the terminal. Another major routine in the control program is the suspend routine. If a task asks for a resource which is temporarily unavailable, then it must be suspended until the resource becomes available again. This is done via a 'Jump SubRoutine' (JSR) instruction to the suspend routine. This routine sets the suspended flag, saves the contents of the register space in the appropriate task control block and pulls data off the stack, also saving it in that task control block until the stack pointer is equal to the value saved in the task control block when the task was started. It then passes control to the scheduler. The last two bytes of data put into the stack (and hence the first two bytes of data saved in the task control block) were the sub-routine return address, which in this case is the task resume address, and so when the resource becomes available and the stack is restored by the scheduler as described above, the task may be restarted by means of a 'ReTurn from Subroutine' (RST) instruction.

Incorporating the BASIC interpreter into the monitor task on level 6 allows the more important tasks to take execution precedence. Thus if messages are arriving from the host then these will be processed at the expense of the monitor/BASIC task.

Whilst interpreting a statement the interpreter will not voluntarily give up control, although it is interruptible by a hardware interrupt from the keyboard, for example. On completing a 'line', the BASIC interpreter will pass control through the "BASIC communication area" to the monitor to dequeue any outstanding keystrokes. In addition, the scheduler routines will either schedule a new task (if the conditions are right) or return control to BASIC.

The monitor routines, being interrupt driven, will pass control to the scheduler immediately a keyboard interrupt has been processed. A communications interrupt from the communications adapter is handled slightly differently in that the scheduler is not invoked. The interrupt handler buffers the incoming data and a simple RTI is issued to resume the interrupted task. The monitor eventually gains control (at the lowest priority level) and will, in due course, detect that a message has arrived and will schedule the outbound task on level 5.

Figure 4:
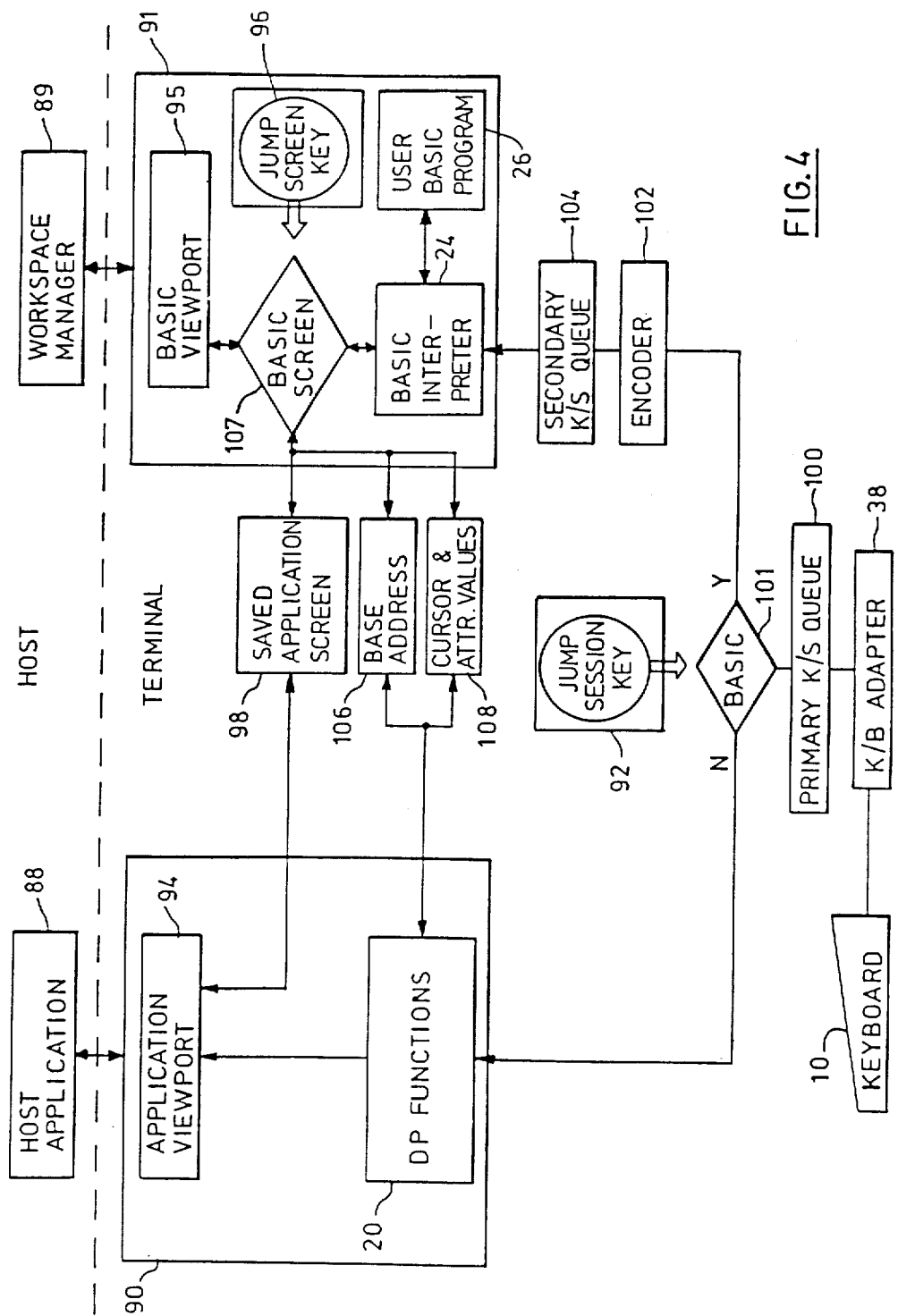
FIG. 4 is a schematic diagram showing the interrelationship between a conventional data processing session and an interactive language session in the display terminal of FIG. 1.

The BASIC interpreter is incorporated into the monitor task and employs simple queuing techniques for incoming keystrokes and host request/responses. In addition to the normal, or primary, keystroke queue (100, FIG. 4) there is a secondary queue (104, FIG. 4) which is arranged to receive information for the BASIC interpreter in the encoding (e.g. ASCII) required by the interpreter.

To initiate BASIC it is first necessary for some other task level to set the 'Initialise BASIC' bit in a flag field of the BASIC communication area. In due course the monitor task address. This will correspond to the BASIC interpreter initialisation entry point mentioned above.

During execution of BASIC, hardware interrupts due, for example, to keyboard operation will occur causing the machine status of the monitor/BASIC task to be stacked and control to be transferred to the interrupt handler(s). After processing a keyboard interrupt, the interrupt handler jumps to the scheduler to allow any newly scheduled tasks to commence execution. Thus if a keyboard interrupt had occured, then the keystroke task (level 3) is scheduled by the keyboard interrupt handler and is awaiting selection by the scheduler. This task is initiated by the JMP instruction and runs (with interrupts enabled) until completion. Eventually the scheduler reaches the previously interrupted monitor task on level 6 and resumes execution of BASIC (and the monitor) by means of an RTI.

As mentioned earlier, the interpreter can use many stack locations during execution. However, any stack locations used by BASIC remain undisturbed because further use of the stack by other tasks or interrupts will use stack addresses lower than the most recently used BASIC stack address. It should be noted that the logical top 76 (FIG. 3) of the stack is at a lower address than the logical bottom 78 (i.e. the stack is "upside-down" in storage). Thus as successive tasks/interrupts relinquish control the stack pointer will be 'unwound' back to the BASIC stack area. At this point the BASIC interpreter can be resumed by issuing a final 'RTI' unstacking the monitor/BASIC task machine status and leaving the stack pointer at the 'resume' address within BASIC.

In the case of the conventional IBM 8775, the stack area normally allocated has an extent limited to 90 bytes low in storage. When the BASIC feature is downstream loaded, secondary initialisation can be used temporarily to disable all interrupts and reallocate the stack area into area 52 of storage which is co-occupied by the BASIC programs and variables. When the operator has finished with BASIC then the stack point must be re-established by primary initialisation at the original location in low storage (039F).

The BASIC interpreter constantly monitors the stack storage extent and normally displays an 'out of storage' message if this becomes dangerously full. It is a simple matter for the interpreter to check that at least the original IBM 8775 requirement of the 90 bytes is available for interrupt handling, tasking, sub-routine calls and work area use. If the point is reached where only 90 bytes remain then the Interpreter will terminate the user's BASIC program and display an 'out of storage' error message.

As mentioned above, the BASIC interpreter is only down-loaded from the host. This can be done when the terminal is initially switched on (i.e. at primary initialisation), but is preferably done subsequently at the request of the user (i.e. at secondary initialisation). At the appropriate time a BASIC partition is established alongside the conventional IBM 3270 terminal processing functions for screen management purpose (see FIG. 4). In this multiple partition mode it is then possible for two concurrent sessions—a DP session 90 and a BASIC session 91—to co-exist. The session 90 for conventional DP functions 20 is managed by the application programs 88 in the host. A workspace manager 89 is additionally provided in the host to manage the BASIC session.

In order to activate the BASIC partition, however, a specific input from the user is required. To this end a "JUMP SESSION" 92 key is provided on the keyboard 10. On operation of this key, the BASIC partition is caused to be activated.

Associated with each of the partitions is a viewport 94, 95 which enables information relating to the partitions to be displayed on the display terminal screen. When the BASIC partition is inactive the DP viewport 94 is visible enabling conventional display terminal operations to be performed and the results of those operations to be viewed. On operating the "JUMP SESSION" key the BASIC partition 91 is activated and the BASIC partition 95 is viewed instead. At the same time a BASIC session is initiated.

During a BASIC session it is possible for the user to interact with data from the DP session in the other partition. A "JUMP SESSION" key 96 is provided on the keyboard for this purpose. This enables the operator to switch between the BASIC viewport and the DP viewport while maintaining BASIC as the active session. The "JUMP SESSION" key is inactive in the DP session. It should be noted that the DP viewport is saved at 98 when the BASIC partition is activated. In addition the operation of the "JUMP SESSION" key 92 to activate BASIC partition causes a secondary keystrokes queue 104 to be brought into operation, this secondary queue being additional to the (primary) keystroke queue 100 normally used for receiving keystrokes in conventional display terminal processing. During a BASIC session therefore all keystrokes pass via the primary queue as normal but are then routed 101 to an encoder 102 where they are encoded into the coding used by the BASIC interpreter 24 (e.g. ASCII) and passed to the secondary queue 104 from where they are read by the interpreter. The coding of data in the primary queue is EBCDIC.

Thus an operator is session with a host DP application can switch to the BASIC session (and vice-versa). After having switched to the BASIC session, the operator can either view the BASIC screen or can examine the preserved application screen from the other session using the "JUMP SESSION" key. Of course, viewing the application screen in this way does not imply that the application session has been re-activated. The keyboard 10 and other resources are still associated with the active BASIC session via the secondary queue. Moreover, it is only possible to communicate with the application in the host by pressing the 'JUMP SESSION' key. However, the BASIC program is at liberty to read and modify fields within the 'inactive' application screen as will now be explained.

Assume that the DP session is active and the operator is browsing through successive screens of application data until he or she eventually reaches one of interest. This screen might contain a number of fields containing values that are to be used in some calculation. The operator then presses the 'JUMP SESSION' key to activate the BASIC session. At this point the terminal will save the "application" viewport at 98 and display the BASIC screen and appropriate prompt in information for the operator.

The "application" viewport is stored in character format as a series of records, each record representing one row of the screen. These records are stored in a block of storage 98 comprising a set of sequential locations starting at a predetermined base location whose address is stored in a base address register 106. Thus, the BASIC interpreter 24 is arranged to treat the stored "application" screen as a file comprising a series of records. Access to the file is via the base address stored in the base address register.

The operator can now check to see if the required BASIC program is in the terminal and types 'RUN'. The BASIC program is arranged to wait for a pre-determined key to be hit. The operator now presses the 'JUMP SCREEN' key and the terminal re-displays the application screen via 107 although BASIC remains the 'active' session. The operator positions the cursor in a conventional way in the first field or row to be processed. By monitoring the position of the cursor on the screen the BASIC interpreter 24 is able to identify the character of the stored "application" screen using the base address stored in the base address register. On receipt of the pre-determined keystroke the BASIC program 26 issues successive INPUT# statements to this file and extracts and processes the fields. Alternatively the operator can move th cursor into successive fields and operate pre-determined keys to cause the BASIC program to process the chosen field using the cursor and attribute values 108.

The "applications" screen can be read or written both sequentially and randomly as allowed by BASIC file management. In accordance with standard BASIC practices for files, the screen file has a reserved number or name. The positions of field attributes are coded as commas. Nulls and non-displayable characters are translated to spaces.

As the display terminal does not have local disc storage, user BASIC programs and data are stored as files in the host. Consequently when a user wishes to run an existing program he or she can request this to be downloaded. Similarly the user can request a BASIC program to be saved in the host.

While the invention has been particularly described with reference to a preferred embodiment thereof it will be understood by those skilled in the art that many modifications and/or additions are possible without departing from the spirit and scope of the invention.

For example, in the preferred embodiment of the present invention a BASIC interpreter is provided. It should be clear, however, that an interpreter for another interactive programming language such as APL could alternatively be provided. Although it is known to provide interpreters for interactive languages on stand-alone machines (e.g. PCs) which can be connected to a host, the approach adopted by the present invention, namely to equip a display terminal, which relies for its operation on a connection to a remote processor, is quite different. Also, although the preferred embodiment of the present invention is based on an IBM 8775 display terminal, the invention may also be implemented on another display terminal, with another microprocessor or implemented as a special-purpose hard-wired display terminal which relies for its operation on a remote processor. Moreover, it should be noted that one or more of the RAM sections 46-56 shown in FIG. 2 could be provided by physically separate memories.

We claim:

1. A display terminal comprising:
   (a) means for communicating with a remote data processor,
   (b) remote data processor storage means for storing an interactive language interpreter, and one or more language programs operable on said display terminal,
   (c) first random access storage means for storing data and terminal processor control code,
   (d) user input means for inputting commands or data to be transmitted to said remote data processor,
   (e) initialization means for causing said remote data processor to transmit said interactive language interpreter and one of said one or more language programs to said display terminal for storage into said random access storage means;
   (f) display means for displaying data received from said remote data processor and data generated by said interactive language interpreter,
   (g) terminal processing means for controlling said display terminal under the control of said remote data processor and in response to said terminal processor control code and operable in at least two processing sessions with at least a first processing session for processing data from said remote processor and a second processing session for processing programming language commands in conjunction with said interactive language interpreter;
   (h) bus means operatively interconnecting said communicating means, said terminal processing means, said storage means, said user input means and said display means, and
   (i) means for switching between said first processing station and said second processing session.

2. The display terminal according to claim 1, in which said terminal processor control code is divided into a plurality of tasks operable in said terminal processing means according to a set task processing priority and in which one of said plurality of tasks is a monitor task, under the control of which interactive language interpretation occurs, said monitor task being assigned the lowest priority level of said plurality of tasks.

3. The display terminal according to claim 2, wherein said first storage means further comprises stack means for the temporary storage of status information relating to interrupted tasks and for the temporary storage of data used during programming language interpreting processing.

4. The display terminal according to claim 3 in which the terminal processing means monitors the amount of storage remaining in the stack means during language interpreting processing and generates an out-of-storage error message when the amount of storage remaining reaches a predetermined minimum required for the temporary storage of status information relating to the interrupted tasks.

5. The display terminal according to claim 1, wherein said control code defines a plurality of display viewports and in which each of said at least two processing sessions is associated with a separate viewport.

6. The display terminal according to claim 5, wherein said means for switching comprises user-operable means for initiating switching between sessions and wherein said terminal processing means under the control of said control code, causes the viewport associated with the currently active session to be displayed.

7. The display terminal according to claim 6 wherein said terminal processing means, under the control of said control code, is responsive to said means for switching when said first processing session is active, and causes said viewport associated with said first session to be stored in said first storage means and said first session to be made inactive.

8. The display terminal according to claim 7, further comprising a second user-operable means for initiating a viewport change, said terminal processing means being responsive to said second user-operable means and said control code when said second processing session is active to cause said viewport associated with said first processing session to be displayed while maintaining said second processing session activated, and when said second user-operable means is operated again, said terminal processing means causes the viewport associated with said first processing session to be stored in said first storage means.

9. The display terminal according to claim 8, further comprising data selection means for selecting data from said stored viewport associated with said first processing session for input to said second processing session.

10. The display terminal according to claim 9, wherein said second processing session stores data to the stored viewport of said first processing session.

11. The display terminal according to claim 1 where the interactive language interpreter is a BASIC language interpreter.

12. The display terminal according to claim 1 where the code for the interactive language interpreter is down-loaded from the remote processor into the display terminal subsequent to primary initialization of the terminal at a subsequent initialization time.

13. A method of displaying data and entering data using a display terminal having a terminal processor, data entry means, local random access storage and a display, said display terminal connected to a remote processor with primary storage for said display terminal, said method comprising:

initializing said display terminal to display data communicating from said remote processor and to transmit locally entered data to said remote processor;

operating said terminal processor to display said communicated data and to accept data entered by said data entry means and transmit said data to said remote processor transferring an interactive language interpreter and program language statements from said primary storage to said local storage;

switching said terminal processor to process said program language statements according to said interactive language interpreter;

directing interpreter of said program language statements by said terminal processor using said interactive language interpreter;

transforming data entered at said display terminal or received from said remote processor into said local storage using said interpreted language statements; and displaying the results of said program language statement execution on said display.

14. The method of claim 13 wherein said step of operating said terminal processor comprises the steps of:

specifying a plurality of processing tasks each having a relative processing priority;

processing said processing tasks in order of said priority;

interrupting a processing task if one of said plurality of tasks with a higher priority is ready for processing.

15. The method of claim 14 wherein said step of directing interpretation of said program language statements is a task of the lowest priority.

16. The method of claim 14 further comprising:

storing status information about a processing task prior to beginning processing of a higher priority task.

17. The method of claim 16 further comprising the steps of:

testing the amount of free local storage in said local storage if said task of directing interpretation of said program language statements is processing;

generating an error message if the amount of said free storage is less than a specified amount.

18. The method of claim 13 further comprising the steps of:

associating the display of said data communicated from said remote processor with a first viewport;

associating the display of said results of said program statement execution with a second viewport;

and wherein the step of switching said terminal processor to process program language statements comprises:

storing said first viewport contents in said local storage;

displaying said second viewport; and activating said terminal processor to process program language statements.

19. The method of claim 18 further comprising the steps of:

activating a display of said stored first viewport;

selecting data from said stored first viewport through the use of data entry means;

processing said selected data with terminal processor in response to said interpreted program language statements.

20. The method of claim 19 further comprising the step of:

storing said processed selected data to said stored first viewport.

* * * * *